United States Patent
Lee et al.

(10) Patent No.: US 7,682,672 B2
(45) Date of Patent: Mar. 23, 2010

(54) NEGATIVE C-TYPE COMPENSATION FILM AND METHOD OF PREPARING THE SAME

(75) Inventors: Hyo Sun Lee, Daejeon Metropolitan (KR); Dong Ryul Kim, Daejeon Metropolitan (KR); Hee Jung Kim, Daejeon Metropolitan (KR); Dae Woo Nam, Daejeon Metropolitan (KR); Sang Uk Ryu, Daejeon Metropolitan (KR); Boong Goon Jeong, Daejeon Metropolitan (KR); Ju Eun Cha, Daegu Metropolitan (KR); Ho Jun Lee, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 612 days.

(21) Appl. No.: 11/519,009

(22) Filed: Sep. 12, 2006

(65) Prior Publication Data
US 2007/0059456 A1    Mar. 15, 2007

(30) Foreign Application Priority Data
Sep. 13, 2005   (KR) ............... 10-2005-0085219

(51) Int. Cl.
G02F 1/13363    (2006.01)
(52) U.S. Cl. ................................. 428/1.33; 349/118
(58) Field of Classification Search ............... 428/1.33, 428/411–412, 416, 522–523, 337; 349/117–121; 525/466, 468, 470, 490, 501.5, 534
See application file for complete search history.

(56) References Cited

U.S. PATENT DOCUMENTS

| | | | | |
|---|---|---|---|---|
| 4,387,209 A * | 6/1983 | Rieder et al. ............. 528/176 |
| 4,743,647 A * | 5/1988 | Domeier ................... 524/516 |
| 5,043,413 A * | 8/1991 | Tanaka ..................... 528/190 |
| 5,087,766 A * | 2/1992 | Kanayama et al. ........ 568/718 |
| 5,183,865 A * | 2/1993 | Chattha .................... 525/530 |
| 5,189,128 A * | 2/1993 | Maw et al. ................ 526/262 |
| 5,240,981 A * | 8/1993 | Chin et al. ................ 524/234 |
| 5,258,483 A * | 11/1993 | Yoshida et al. ............. 528/87 |
| 5,285,303 A * | 2/1994 | Okada et al. .............. 349/117 |
| 5,637,387 A * | 6/1997 | Chin et al. ................ 442/149 |
| 6,014,488 A * | 1/2000 | Shustack ................... 385/128 |
| 6,100,367 A * | 8/2000 | Kobayashi et al. ........ 528/196 |
| 6,174,966 B1 * | 1/2001 | Kobayashi et al. ........ 525/464 |
| 6,294,229 B1 * | 9/2001 | Satoh et al. ................. 428/1.1 |
| 7,109,274 B2 * | 9/2006 | Acar et al. ................ 525/439 |
| 2003/0215582 A1 * | 11/2003 | Bermel .................... 428/1.31 |
| 2004/0227879 A1 * | 11/2004 | Elman et al. ............. 349/117 |

FOREIGN PATENT DOCUMENTS

| | | |
|---|---|---|
| EP | 1 469 328 A1 | 10/2004 |
| JP | 2001-194668 | 7/2001 |
| JP | 2001-194668 A | 7/2001 |

* cited by examiner

*Primary Examiner*—Sophie Hon
(74) *Attorney, Agent, or Firm*—McKenna Long & Aldridge LLP

(57) ABSTRACT

Disclosed are a negative C-type compensation film and a method of preparing the same. The negative C-type compensation film includes a) a base layer, and b) a polymer layer comprising polyarylate prepared by a method comprising the step of copolymerizing divalent phenols, divalent aromatic carboxylic acid halides, and allyl bisphenol derivatives, the base layer and the polymer layer being sequentially layered. The compensation film is capable of being used for the negative C-type compensation film without a stretching process, significantly reduces the thickness of the compensation film, and has significantly improved interlayer adhesion force in a multilayer structure.

20 Claims, 2 Drawing Sheets

[Figure 1]
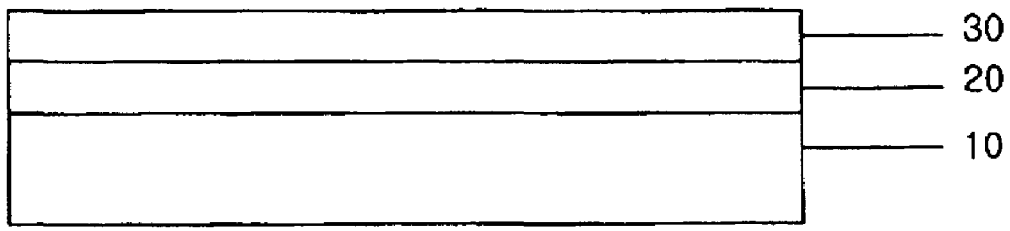
[Figure 2]
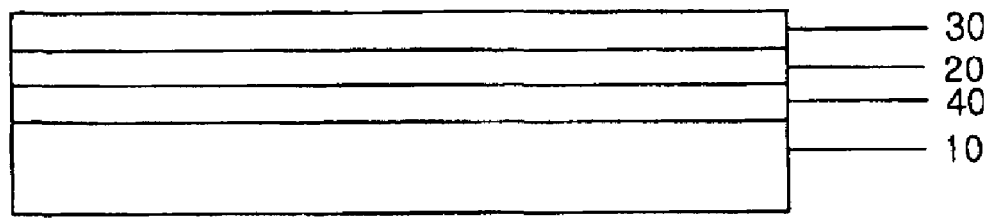
[Figure 3]
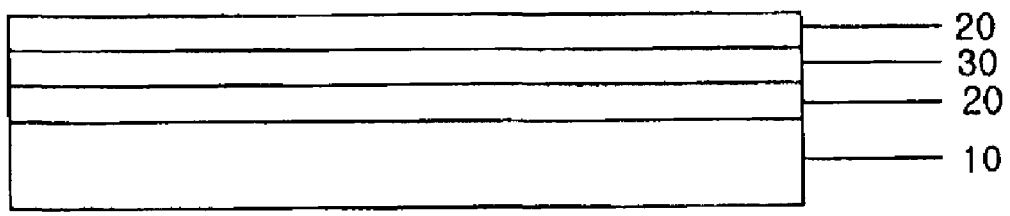
[Figure 4]
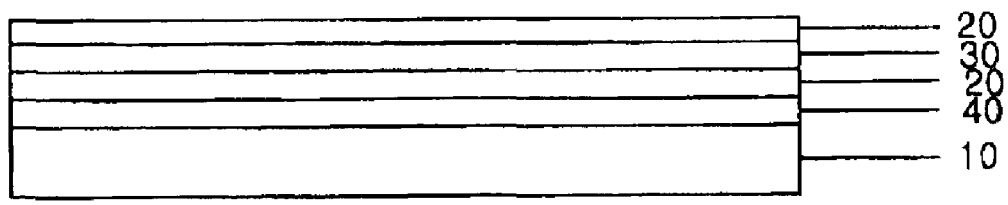

[Figure 5]
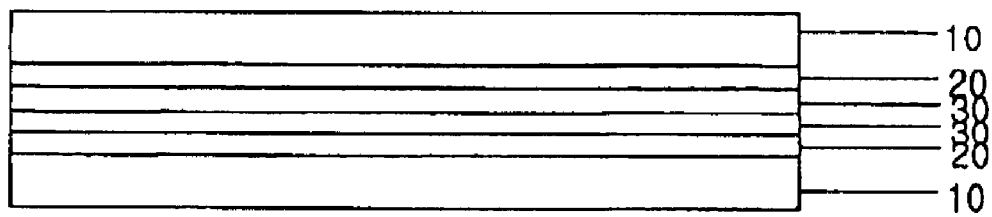

NEGATIVE C-TYPE COMPENSATION FILM AND METHOD OF PREPARING THE SAME

This application claims the benefit of Korean Patent Application No. 10-2005-0085219, filed on Sep. 13, 2005, which is hereby incorporated by reference for all purposes as if fully set forth herein.

TECHNICAL FIELD

The present invention relates to a negative C-type compensation film and a method of preparing the same. More particularly, the present invention pertains to a negative C-type compensation film, which is capable of being used without a stretching process and has a significantly reduced thickness and significantly improved interlayer adhesion force when the film has a multilayer structure, and a method of preparing the same.

This application claims the benefit of the filing date of Korean Patent Application Nos. 10-2005-0085219, filed on Sep. 13, 2005, in the Korean Intellectual Property Office, the disclosure of which is incorporated herein in its entirety by reference.

BACKGROUND ART

Polyarylate is typically an aromatic polyester composed of bisphenol A that is aromatic alcohol, terephthalate and isophthalate that is aromatic acid halides. The conventional polyarylate films have high degree of optical transmission, and are excellent in thermal and mechanical properties. However, the conventional polyarylate films are disadvantageous in that the melting temperature and viscosity is high, and the positive birefringence occurs in the surface direction during processing. As a result, in order to use polyarylates as optical films, many studies have been carried out on the method of controlling the birefringence in the surface direction.

Meanwhile, a display device using liquid crystal is disadvantageous in that a viewing angle is narrow due to intrinsic optical characteristics of a liquid crystal molecule and a polarizer. Particularly, in accordance with the recent trend toward enlargement of a liquid crystal display, the use of compensation films is required to assure a wide viewing angle. To enlarge a narrow viewing angle in the liquid crystal display, a material having a characteristic of delaying a phase difference of light is used. A delaying direction of the phase difference of light is classified into a surface direction and a thickness direction of the film. A material having birefringences to the directions is used in order to compensate the viewing angle. The phase difference of the compensation film is defined by the following equation (1):

$$R_{th} = \left(n_z - \frac{n_x + n_y}{2}\right) \times d \quad (1)$$

in the equation (1), $R_{th}$ is a phase difference in thickness direction, $n_x$ and $n_y$ are refractive indexes of the film in surface direction, $n_z$ is a refractive index of the film in thickness direction, and d is a thickness of the film. If there is no birefringence of the film in surface direction ($n_x = n_y$), when $n_x$ is more than $n_z$, $R_{th}$ has a negative value and, when $n_x$ is smaller than $n_z$, $R_{th}$ has a positive value.

Polymer chains must be oriented perpendicularly to the film surface or in a surface direction so that the polymer film has birefringence. In the case of when it is difficult to completely satisfy the above-mentioned condition, at least specific portion of the polymer chains must be oriented. The degree of the orientation of the polymer chains depends on components constituting the polymer, the film thickness, a drying condition of a solvent, etc. For example, if the film thickness is reduced to a molecular level, since the orientation of the polymer is maximized on a surface of the film, it is possible to obtain very high birefringence. Since the liquid crystal molecules have the positive birefringence, the material having the negative birefringence must be used to compensate the positive birefringence. A representative polymer having the negative birefringence is polystyrene. Further, if the film is uniaxially or biaxially stretched, an optic axis is oriented in a surface direction of the film. Accordingly, it is possible to obtain some negative birefringence even if it is not sufficient.

Generally, it is known that the birefringence in surface direction is used to produce a A-type compensation film. The birefringence in surface direction is obtained by stretching the polymer film in the surface direction to orient the polymer chains in the surface direction. On the other hand, the birefringence in thickness direction that is used to produce a C-type compensation film is obtained by uniaxially or biaxially stretching a film that is subjected to extrusion or solution casting. For example, a phase difference film in thickness direction for assuring a wide viewing angle is prepared by uniaxially or biaxially stretching a cellulose- or polycarbonate-based polymer film or by applying the liquid crystal molecules on a polymer film base substrate. However, since the birefringence in thickness direction capable of being obtained using the stretching is very little and changes a refractive index in surface direction, it is difficult to control the phase difference with respect to all directions. Additionally, in the case of when the film is greatly stretched at low temperatures in order to obtain high birefringence, the thickness of the film is reduced. Accordingly, there are disadvantages in that it is difficult to obtain the desired phase difference and the birefringence is nonuniform.

Furthermore, in the case of when polyarylate is applied on a base substrate such as polycarbonate, adhesion force between the base substrate and polyarylate may be poor. U.S. Pat. Nos. 6,100,367 and 6,174,966 describe a method of adding monomers, which are capable of providing an alkoxysilyl group, to polycarbonate or polyarylate during synthesis of polycarbonate or polyarylate so as to increase adhesion force to other base substrates. Similarly, U.S. Pat. No. 5,258,483 describes the use of polyarylates to which an epoxy group is added instead of an alkoxysilyl group.

Meanwhile, EP No. 1469328 discloses that a transparent optical film of polyimide is applied on a TAC (triacetyl cellulose) film to obtain uniform compensation and to remove irregularity causing rainbow-colored rays. JP-A-2001-194668 discloses a compensation film that is prepared by layering stretched polycarbonate films. However, the production requires a complicated layering process and also requires optic axes which are perpendicular to each other when two films are layered.

U.S. Pat. No. 5,043,413 discloses a method of preparing polyarylate having low birefringence in surface direction. In detail, in the above-mentioned US patent, polyarylate has low birefringence of $25.7 \times 10^{-5}$ or less when the polyarylate is subjected to a solution casting process to produce a film, and then the film is stretched. However, the birefringence that is obtained using the stretching is the birefringence in surface direction, and is not useful for a C-type compensation film requiring the birefringence in thickness direction.

U.S. Pat. No. 5,285,303 discloses a method of uniaxially stretching a polyarylate film as a compensation film for a wide viewing angle and performing shrinkage in a direction perpendicular to the stretching direction so as to obtain the birefringence in thickness direction. A phase difference of liquid crystal is typically 100 to 400. In order to compensate the phase difference, it is necessary to assure a phase difference of 100 to 400 which has a value opposite to the former phase difference. However, the stretching is disadvantageous in that the film thickness is reduced and it is difficult to orient the polymers to great degree, thus there is a limit in assuring the desired phase difference.

DISCLOSURE

Technical Problem

The present inventors have found polyarylate that is capable of being used for a negative C-type compensation film without a stretching process and has excellent adhesion force to other layers such as a transparent base substrate. Therefore, an object of the present invention is to provide a compensation film that includes polyarylate capable of being used for the negative C-type compensation film without a stretching process, significantly reducing the thickness of the compensation film, and providing excellent interlayer adhesion force to a multilayered compensation film, and a method of preparing the same.

Technical Solution

In order to accomplish the above object, the present invention provides a negative C-type compensation film, comprising a) a base layer, and b) a polymer layer comprising polyarylate which comprises a unit represented by the formula (1) and prepared by copolymerizing divalent phenols, divalent aromatic carboxylic acid halides, and allyl bisphenol derivatives of the formula (2), the base layer and the polymer layer being sequentially layered.

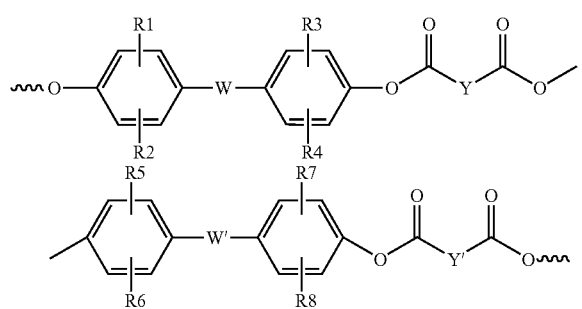

(1)

wherein $R^1$ to $R^8$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, in which the alkenyl of the above substituent(s) may be introduced with at least one functional group of an epoxide group, an alkoxy group, a hydroxy group and an amine group, provided that at least one of $R^1$ to $R^4$ or at least one of $R^5$ to $R^8$ is alkenyl having 2 to 12 carbon atoms, alkylalkenyl having 3 to 12 carbon atoms or arylalkenyl having 8 to 12 carbon atoms, in which the alkenyl of the above substituent(s) may be introduced with at least one functional group of an epoxide group, an alkoxy group, a hydroxy group and an amine group;

W and W' are each independently directly bonded, or are each independently oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms; and —OOCYCOO— and —OOCY'COO— are each independently terephthalic acid, isophthalic acid, dibenzoic acid or naphthalene dicarboxylic acid, in which the aromatic group may be substituted with a substituent selected from the group consisting of alkyl having 1 to 8 carbon atoms, aryl, alkylaryl and halogen, and

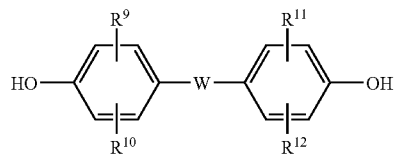

(2)

wherein $R^9$ to $R^{12}$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, provided that at least one of $R^9$ to $R^{12}$ is alkenyl having 2 to 12 carbon atoms, alkylalkenyl having 3 to 12 carbon atoms or arylalkenyl having 8 to 12 carbon atoms; and W is directly bonded, or is oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms.

Furthermore, the present invention provides a method of preparing the negative C-type compensation film. The method includes a) mixing polyarylate, which is prepared by the method comprising the step of copolymerizing divalent phenols, divalent aromatic carboxylic acid halides, and allyl bisphenol derivatives of the formula (2), and an organic solvent to prepare a polyarylate solution, b) applying the polyarylate solution on a base substrate, and volatilizing a solvent to produce a cast film, and c) drying the case film to produce the compensation film.

Furthermore, the present invention provides a liquid crystal display having the negative C-type compensation film according to the invention.

DESCRIPTION OF DRAWINGS

FIGS. 1 to 5 are sectional views of structures of a compensation film according to the present invention.

(10: base layer, 20: protective layer, 30: polymer layer comprising polyarylate according to the present invention, 40: surface reforming layer)

BEST MODE

Hereinafter, a detailed description will be given of the present invention.

The present invention relates to a negative C-type compensation film. The negative C-type compensation film has a polymer layer that includes polyarylate prepared using a method comprising the step of copolymerizing divalent phenol, divalent aromatic carboxylic acid halides, and allyl bisphenol derivatives of the above formula (2) on a base layer.

The polyarylate prepared in the copolymerizing step contains at least a double bond in the main chain of a polymer via an allyl group of allyl bisphenol derivative represented by the formula (2). For example, an allyl group is contained in at least one of $R^1$ to $R^4$ or at least one of $R^5$ to $R^8$ in the formula (1). Therefore, the polyarylate as in the above can be introduced with various functional groups at the main chain of a polymer through double bonds contained in the main chain of the polymer.

Further, the concentration of the double bonds and functional groups in the main chain of polyarylate of the invention can be adjusted by controlling the use amount of allyl bisphenol derivatives represented by the formula (2) or using allyl bisphenol derivatives with appropriate number of allyl groups when preparing the polyarylate in the invention. Moreover, the polyarylate according to the invention described above can be polymerized with other polyarylates depending on the content of allyl bisphenol derivative to divalent phenol, and then be introduced with functional groups.

As described above, examples of the functional group, which can be introduced to the polyarylate according to the invention having double bonds in the main chain of the polymer, include an epoxide group, an alkoxy group, a hydroxy group, an amine group or the like. Examples of the polyarylate introduced with the functional group include the polyarylate with the double bond being substituted with epoxide, the polyarylate with the double bond being substituted with alkoxy and hydroxy, the polyarylate with the double bond being substituted with dihydroxy, the polyarylate with the double bond being substituted with alkoxy and amine, or the like. In order to improve the adhesion force in the polyarylate of the invention, it is more preferable that an epoxy group or a hydroxy group is introduced.

Examples of the method for introducing functional groups to the polyarylate according to the invention include a method for substituting an allyl group with epoxide group using an epoxidizing agent, a method for substituting an allyl group with an alkoxy group (—OR) and a hydroxy group (—OH) by decomposing the epoxidized polyarylate in the presence of alcohol, a method for substituting an allyl group with a dihydroxy group by adding water to the epoxidized polyarylate or the like.

Specific examples of the polyarylate of the invention include polyarylates containing a unit selected from the following formulas (3) to (6), but the scope of the invention is not limited thereto.

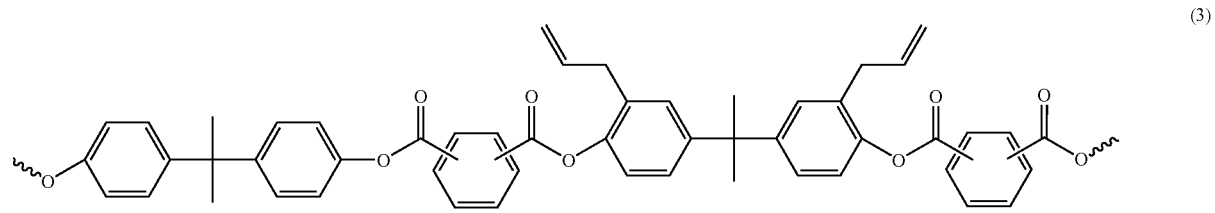

(3)

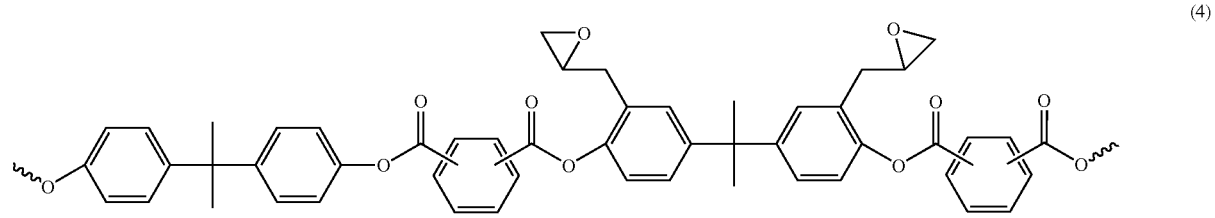

(4)

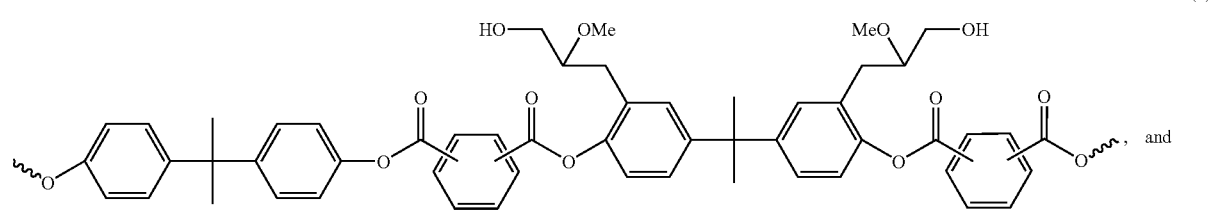

(5)

, and

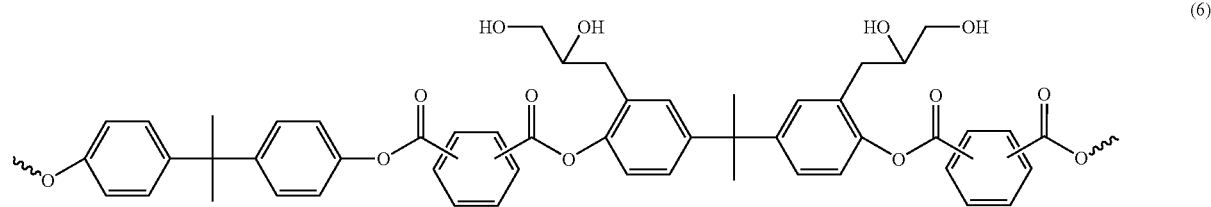

(6)

In the invention, examples of aromatic dihydroxy compounds such as divalent phenol and the allyl bisphenol derivative used in the preparation of polyarylate include bis(4-hydroxyaryl)alkane such as bis(4-hydroxyphenyl)methane, 2,2-bis(4-hydroxyphenyl)propane (BPA), 2,2-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl) phenylmethane, 4,4-dihydroxyphenyl-1,1-m-diisopropylbenzene, 4,4-dihydroxyphenyl-9,9-fluorene, 2,2-bis(4-hydroxyphenyl)fluorene (BHPF), 9,9-bis(3,5-dimethyl-4-hydroxyphenyl)fluorene (BDMPF) or 9,9-bis(3,5-dibromo-4-hydroxyphenyl)fluorene (BFBPF); aromatic dihydroxy compounds containing alkenyl such as 4,4'-(1-methylethylidene)bis(2-(2-propenyl)phenol and the like, and these may be used in the mixture of one or more kinds. Further, examples of aromatic dihydroxy compounds include bis(hydroxyaryl)cycloalkane such as 1,1-bis(4,4-hydroxyphenyl)cyclopentane, 1,1-bis(4,4-hydroxyphenyl)cyclohexane, 1-methyl-1-(4-hydroxyphenyl)-4-(dimethyl-4-hydroxyphenyl)cyclohexane, 4-{1-[3-(4-hydroxyphenyl)-4-methylcyclohexyl]-1-methylethyl}phenol, 4,4-[1-methyl-4-(1-methylethyl)-1,3-cyclohexylidyl]bisphenol or 2,2,2,2-tetrahydro-3,3,3,3-tetramethyl-1,1-spirobis-[1H]-indene-6,6-diol, and these may be used in a mixture of one or more kinds. Also, examples of aromatic dihydroxy compounds include dihydroxydiaryl ethers such as bis(4-hydroxyphenyl) ether, bis(4-hydroxy-3,5-dichlorophenyl) ether or 4,4-dihydroxy-3,3-dimethylphenyl ether; dihydroxydiaryl sulfates such as 4,4-dihydroxydiphenyl sulfate or 4,4-dihydroxy-3,3-dimethyldiphenyl sulfate; dihydroxydiaryl sulfoxides such as 4,4-dihydroxydiphenyl sulfoxide or 4,4-dihydroxy-3,3-dimethyldiphenyl sulfoxide; and dihydroxydiaryl sulfones such as 4,4-dihydroxydiphenyl sulfone or 4,4-dihydroxy-3,3-dimethyldiphenyl sulfone; and the like, and these may be used alone or in a mixture of two or more kinds.

In the invention, the kind of divalent aromatic carboxylic acid halide that can be used in preparing the polyarylate is not particularly limited, but terephthalic acid halides, isophthalic acid halides, dibenzoic acid halides, naphthalene dicarboxylic acid halides, or aromatic dicarboxylic acid halides in which the aromatic groups of these compounds are substituted with alkyl having 1 to 8 carbon atoms, aryl, arylalkyl or halogen, can be used. These may be used alone or in a mixture of two or more. In the invention, it is more preferable that isophthalic acid halide or terephthalic acid halide is used alone or in a mixture thereof.

In the invention, it is preferable that a dihydroxy monomer including the divalent phenol and the allyl bisphenol derivative, and a divalent aromatic carboxylic acid halide are used in the molar ratio of 1:1 during the production of polyarylate. Further, it is preferable that the allyl bisphenol derivative is used in the amount of 0.1 mol % to 99.9 mol % with respect to the divalent phenol. Also, it is preferable that the allyl bisphenol derivative is contained in the amount of 0.01 to 49.9 mol % in the polyarylate of the invention. The above-mentioned polyarylate of the invention has the weight average molecular weight of 10,000 g/mol or higher, and preferably 20,000 g/mol or higher.

In order to improve the surface characteristics, the adhesion force, weatherability, thermal stability of a film fabricated by polyarylates, additives known in the field of arts can be further used, in addition to the above-mentioned components, when preparing the polyarylate according to the invention.

In the invention, the copolymerizing method for synthesizing polyarylate is not particularly limited, but a method known in the field of arts can be used. Specific method is exemplified in Synthetic Examples described below.

The present invention provides a method of preparing a negative C-type compensation film using the above-mentioned polyarylate. In detail, the method of the present invention includes a) mixing polyarylate, which is prepared by the method comprising the step of copolymerizing divalent phenol, divalent aromatic carboxylic acid halides, and allyl bisphenol derivatives of the above formula (2), and an organic solvent to prepare a polyarylate solution, b) applying the polyarylate solution on a base substrate, and volatilizing the solvent to produce a cast film, and c) drying the case film to produce the compensation film. The steps will be described in detail.

In the method according to the present invention, polyarylate is mixed with the organic solvent to prepare polyarylate. Examples of the organic solvent include, but is not limited to methylene chloride, dichloroethane, tetrahydrofuran, iso-oxolane, dioxane, toluene, alcohol, etc. It is preferable that the polyarylate solution contain 5 to 30 wt % of polymer. If the solution is used in a concentration that is less than or more than the above-mentioned range, viscosity of the solution is very high or very low, thus the solution is unsuitable for coating. Additionally, it is difficult to use the solution practically due to solubility of the polymer.

Subsequently, the base substrate is coated with the polyarylate solution, and the solvent is volatilized to produce the cast film. In the present invention, the base substrate may provide a phase difference of the compensation film in surface direction according to the present invention. In the present invention, the phase difference of the base substrate, which is defined by the above-mentioned equation (1), is 100 nm or less, and preferably 10 to 100 nm, and the layer thickness is 1 to 200 μm, and preferably 10 to 200 μm. Any material may be used as the material of the base substrate as long as the material is used for the compensation film known in the art. For example, the base substrate is a glass plate or an optically uniform and transparent polymer film which is formed of the material selected from the group consisting of polycarbonate, triacetyl cellulose, a cycloolefin polymer, a cycloolefin copolymer, and a (meth)acrylate polymer, or in which one or more of them are layered.

Examples of the coating process are not limited, but include processes known in the art. For example, a bar coating process may be used. In the compensation film according to the present invention, with respect to the layer including polyarylate, the phase difference which is defined by the above-mentioned equation (1) has a negative value and is preferably 10 nm or more, and the layer thickness is 1 to 100 μm, and preferably 10 to 100 μm.

In the above-mentioned step, it is preferable that the volatilization of the solvent be slowly performed at room temperature or at a temperature of 50° C. or lower so as not to affect productivity of the film. The reason is that the rapid volatilization of the solvent contracts the film, thus it is difficult to provide the film having a flat surface. In an embodiment of the present invention, the temperature may be stepwise increased to stepwise volatilize the solvent. The solvent is volatilized and the polymer chains are oriented, causing the phase difference of the film in thickness direction. Thus, the type of solvent and the volatilization rate of the solvent may affect the phase difference of the film.

Subsequently, the cast film is dried to produce the compensation film. Since internal stress occurs due to shrinkage of the film during the drying of the film, it is necessary to reduce the shrinkage to minimize the occurrence of the birefringence in surface direction. Accordingly, in the present invention, it is preferable that the drying of the cast film be performed while the dimension of the cast film is constant. In the embodiment of the present invention, the cast film is dried while being fixed to a frame which is designed so that force is uniformly applied to the entire cast film, thereby preparing the polyarylate compensation film having the minimized internal stress. The drying may be performed at, for example, about 150° C., so that the content of solvent remaining in the compensation film is 0.05% or less. Further, during the drying of the cast film, the drying temperature may be increased stepwise to prevent the film from being sagged at high temperatures, thereby preparing the film having the flat surface.

During the production of the compensation film of the present invention, a small amount of additive may be used to improve weatherability, thermal stability, and surface property of the film, or to improve adhesion force.

As described above, the base film may be subjected to surface treatment selected from the group consisting of corona treatment, acid/base treatment, and UV treatment.

The surface treated base film according to the present invention may further include a protective layer, for example, an organic or organic/inorganic hybrid protective layer. The organic or organic/inorganic hybrid protective layer 20 may be interposed between a base layer 10 and a polyarylate layer 30, and/or layered on the polyarylate layer 30 as shown in FIGS. 1 to 5. The protective layer may improve mechanical properties, for example, the protective layer may prevent curling, and may also improve polymer orientation of the polymer-coated layer which is in contact with the protective layer.

The organic/inorganic hybrid protective layer may include organosilane, metal alkoxide, a filler, or a mixture thereof. In connection with this, it is preferable that the organosilane content be 20 to 99.99 parts by weight based on 100 parts by weight of the total composition. Additionally, it is preferable that the metal alkoxide content be 20 to 70 parts by weight based on 100 parts by weight of the total composition.

Furthermore, the organic/inorganic hybrid protective layer may be formed of a resin composition capable of being cured at room temperature and cured by heating. The organic/inorganic hybrid protective layer may be formed of a composition that comprises a silica-dispersed oligomer solution of organosilane prepared by partially hydrolyzing hydrolyzable organosilane in an organic solvent with colloidal silica dispersed within, water, or a mixture thereof; an acryl resin, which is selected from the group consisting of an acrylate oligomer solution, a methacrylate oligomer solution, and an acrylate/methacrylate oligomer solution; and a curing catalyst. Additionally, the organic/inorganic hybrid protective layer may be formed of a composition that comprises a silicone oligomer solution, which has two or more acrylate functional groups by hydrolyzing oily colloidal silica and a silicone coupling agent capable of being cured by UV or heat, an acrylate oligomer solution, an acrylate monomer solution, a photoinitiator, and/or a thermal initiator.

Furthermore, the organic protective layer may be formed of a polymer that is selected from the group consisting of an acrylate polymer, a methacrylate polymer, and an acrylate/methacrylate copolymer cured by UV or heat.

It is preferable that the protective layer be 0.01 to 10 µm in thickness.

The compensation film of the present invention may further include a surface reforming layer if necessary. The surface reforming layer 40 may be interposed between a base layer 10 and a protective layer 20 as shown in FIGS. 2 and 4, or between the base layer 10 and a polyarylate layer 30.

The compensation film according to the present invention has a phase difference of −30 nm or less, preferably −30 to −300 nm, and more preferably −50 to −200 nm, which is defined by the following equation (1):

$$R_{th} = \left(n_z - \frac{n_x + n_y}{2}\right) \times d \quad (1)$$

wherein $R_{th}$ is a phase difference in thickness direction, $n_x$ and $n_y$ are refractive indexes of the film in surface direction, $n_z$ is a refractive index of the film in thickness direction, and d is a thickness of the film.

The compensation film according to the present invention is characterized as a layer composed of polyarylate of the present invention on the base substrate. Since the layer composed of polyarylate has high negative birefringence in thickness direction without the stretching process, the layer may act as a negative C-type compensation film without the stretching process. Furthermore, since it is unnecessary to stretch the polyarylate layer, the layer may be directly formed on the base substrate using the coating instead of attaching the layer to the base substrate after the separated layer is formed. Thereby, it is possible to significantly reduce the thickness of the compensation film. Additionally, polyarylate according to the present invention has excellent adhesion force resulting from chemical bonding to the adjacent base substrate or protective layer caused by the double bond or the functional group provided to the main chain of the polymer when the polyarylate is coated.

MODE FOR INVENTION

A better understanding of the present invention may be obtained in light of the following Synthetic Examples and Examples which are set forth to illustrate, but are not to be construed to limit the present invention.

Synthetic Example 1

Synthesis of Polyarylate Having 3 mol of Allyl Bisphenol Derivative in Dihydroxy Bisphenol Monomer 37.0 g of 2,2-bis(4-hydroxyphenyl)propane, 3.1 g of 2,2-bis(3-(2-propenyl)-4-hydroxyphenyl)propane as an allyl bisphenol derivative, 15.2 g of NaOH, and 364 g of distilled water were mixed in a reactor provided with a stirrer, and then dissolved by stirring. Then, while maintaining the reactor temperature at 20° C., a solution of 1.2 g of benzyltriethylammonium bromide in 36.4 g of methylene chloride was added and then stirred vigorously. Next, 0.4 g of 4-t-butylphenol as a molecular weight modifier and a solution of 0.1 g of NaOH in 3 g of water were added to prepare a mixture aqueous solution.

Meanwhile, 17.4 g of an aromatic carboxylic acid mixture where isophthalic acid chloride and terephthalic acid chloride were mixed in the same mole number was dissolved in 452 g of methylene chloride. This solution was added to the mixture aqueous solution. After polymerizing by stirring at 700 rpm for 1 hour, 1.0 g of 4-t-butyl phenol and a solution of 0.3 g of NaOH in 7 g of water were added, and then stirred for 10 min. Subsequently, a solution of 1.0 g of benzoic acid in 9.6 g of methylene chloride was added and then stirred for 10 minutes. Then, 15 mL of acetic acid was added to terminate the reaction, and washed multiple times with 1 fold-volume of methylene chloride and 2 fold-volume of distilled water. The washing was repeated until the remaining solution had the conductance of 20 μs/cm or lower, and the solution was added to methanol to precipitate polymers. Dihydroxy monomer in the synthesized polyarylate included 95 mol % of 2,2-bis(4-hydroxyphenyl)propane (BPA) and 5 mol % of allyl bisphenol derivative. The glass transition temperature was 200° C. and the molecular weight was 104,000 g/mol.

Synthetic Example 2

Synthesis of Polyarylate which has 5 mol % of Allyl Bisphenol Derivative in Dihydroxy Bisphenol Monomer and to which an Epoxide Group is Added 1.2 g of m-chloroperbenzoic acid (m-CPBA) as an epoxizing agent were mixed with 7.5 g of polyarylate prepared according to Synthetic Example 1, and air was removed. 300 mL of anhydrous methylene chloride was added, and the stirring was performed at room temperature for 24 hours. After the presence of the epoxide group was confirmed, methylene chloride was added to appropriately dilute the resulting solution. Precipitation was performed in methanol, washing was performed using methanol, and drying was performed. The synthesized polyarylate had the glass transition temperature of 200° C. and the molecular weight of 96,000 g/mol.

Synthetic Example 3

Synthesis of Polyarylate which has 5 mol % of Allyl Bisphenol Derivative in Dihydroxy Bisphenol Monomer and to which a Hydroxy Group is Added 10 g of epoxy polyarylate prepared according to Synthetic Example 2 was dissolved in 200 mL of anhydrous THF, 0.5 mL of sulfuric acid and 3 mL of anhydrous methanol were added, and stirring was performed at room temperature for 2 hours. After completion of the reaction was confirmed using the NMR, a predetermined amount of THF was added to dilute the resulting solution. Precipitation was performed in methanol. The resulting polyarylate had methoxy (OMe) and hydroxy (OH) functional groups. The synthesized polyarylate had the glass transition temperature of 198° C. and the molecular weight of 116,000 g/mol.

Synthetic Example 4

Polyarylate was synthesized through the same procedure as in Synthetic Example 1, except that the stirring speed during the polymerization was 500 rpm. The aromatic dihydroxy monomer in the synthesized polyarylate included 95 mol % of 2,2-bis(4-hydroxyphenyl)propane (BPA) and 5 mol % of the allyl bisphenol derivative. The glass transition temperature was 182° C. and the molecular weight was 43,000 g/mol.

Synthetic Example 5

Polyarylate was synthesized through the same procedure as in Synthetic Example 2, except that the stirring speed during the polymerization was 500 rpm. The aromatic dihydroxy monomer in the synthesized polyarylate included 95 mol % of 2,2-bis(4-hydroxyphenyl)propane (BPA) and 5 mol % of the allyl bisphenol derivative. The glass transition temperature was 192° C. and the molecular weight was 52,000 g/mol.

Synthetic Example 6

Polyarylate was synthesized through the same procedure as in Synthetic Example 3, except that the stirring speed during the polymerization was 500 rpm. The aromatic dihydroxy monomer in the synthesized polyarylate included 95 mol % of 2,2-bis(4-hydroxyphenyl)propane (BPA) and 5 mol % of the allyl bisphenol derivative. The glass transition temperature was 190° C. and the molecular weight was 51,000 g/mol.

Synthetic Example 7

Polyarylate was synthesized through the same procedure as in Synthetic Example 1, except that the stirring speed during the polymerization was 500 rpm and usage of 2,2-bis(4-hydroxyphenyl)propane and an allyl bisphenol derivative was controlled. The aromatic dihydroxy monomer in the synthesized polyarylate included 90 mol % of 2,2-bis(4-hydroxyphenyl)propane (BPA) and 10 mol % of the allyl bisphenol derivative. The glass transition temperature was 177° C. and the molecular weight was 50,000 g/mol.

Synthetic Example 8

Polyarylate was synthesized through the same procedure as in Synthetic Example 1, except that the stirring speed during the polymerization was 500 rpm and usage of 2,2-bis(4-hydroxyphenyl)propane and an allyl bisphenol derivative was controlled. The aromatic dihydroxy monomer in the synthesized polyarylate included 80 mol % of 2,2-bis(4-hydroxyphenyl)propane (BPA) and 20 mol % of the allyl bisphenol derivative. The glass transition temperature was 158° C. and the molecular weight was 54,000 g/mol.

Experimental Example 1

Production of the Polyarylate Film

Polyarylates of Synthetic Examples 1 to 6 were subjected to solution casting to produce films, and phase differences in thickness and surface directions were measured. In detail, polyarylates of the above-mentioned Synthetic Examples were dissolved in the dichloroethane solvent to produce 10 wt % of polymer solutions. In order to obtain the polymer solutions having the constant concentration, after the mixing of polyarylate and the solvent, the temperature was increased to 70° C. and mixing was performed. The solutions were cast on the glass plates using bar coating to form films having the thickness of 5 μm. The films that were cast on the glass plates were dried at normal temperature for 6 hours while the dimensions of the films were maintained, and separated from the glass plates. Next, the residual solvent was completely dried at 150° C. Reduction in weight of the residual solvent was confirmed while the temperature was increased using the thermal analysis device. The phase difference at the angle of −50° and 50° between the film surface and light ray was measured to calculate the phase difference of the film in thickness direction using the following equation (2):

$$R_{th} = \frac{(R_\theta - R_{in(\theta=0)}) \times \cos\theta}{\sin^2\theta} \qquad (2)$$

wherein $R_{th}$ is the phase difference in thickness direction, $R_\theta$ is the phase difference at the angle of θ, $R_{in}$ is the phase difference of the measured film in surface direction when θ is 0, and θ is the angle between the film surface and incident light. The results are described in Table 1.

TABLE 1

| Entry | Thickness of polyarylate layer (μm) | $R_{in}$(nm) | Total $R_{th}$(nm) |
|---|---|---|---|
| Synthetic Example 1 | 5.7 | 0 | −112 |
| Synthetic Example 2 | 5.3 | 0 | −115 |
| Synthetic Example 3 | 3.3 | 0 | −67 |
| Synthetic Example 4 | 5.8 | 0 | −110 |
| Synthetic Example 5 | 5.4 | 0 | −109 |
| Synthetic Example 6 | 4.9 | 0 | −93 |

Experimental Example 2

Production of the Film Having the Polyarylate Layer on the Base Substrate

The film was prepared through the same procedure as Experimental Example 1, except that the polyarylate layer was formed on polycarbonate (Pure Ace, Teijin Co.) having the thickness of 2 μm. The phase differences of the polyarylate film in thickness and surface directions were measured, and the results are described in Table 2.

Comparative Example 1

The film was prepared through the same procedure as Experimental Example 2, except that the layer was formed on a unstretched polycarbonate base substrate (Pure Ace, Teijin Co.) using polyarylate where the polymer main chain did not have the functional group and the double bond (the glass transition temperature was 207° C. and the molecular weight was 70,000 g/mol) instead of polyarylate of the present invention. The phase differences of the polyarylate film in thickness and surface directions were measured, and the results are described in Table 2.

TABLE 2

| Entry | Thickness of PC/hard coating layer (μm) | Thickness of polyarylate | $R_{in}$(nm) | Total $R_{th}$(nm) |
|---|---|---|---|---|
| PC(polycarbonate) | 2.0 | 0 | 1.3 | −89 |
| comparative Example 1 | 2.0 | 5.0 | 12.7 | −175 |
| Synthetic Example 4 | 2.0 | 3.0 | 9.1 | −148 |
| Synthetic Example 7 | 2.0 | 4.0 | 8.9 | −135 |
| Synthetic Example 8 | 2.0 | 5.0 | 6.6 | −126 |

As shown in Tables 1 and 2, the phase difference was easily controlled by the thickness of the film, and the polyarylate layer of the present invention had the phase difference enough to use the polyarylate layer as the compensation film even though the thickness of the polyarylate layer of the present invention was reduced.

Experimental Example 3

The polyarylates synthesized according to Synthetic Examples 1 to 8 and Comparative Example 1 were applied on the base substrates and dried at 100° C. through the same procedure as Experimental Example 1, except that PC (polycarbonate) cured with acrylate was used as the base substrate. The films were subjected to the stripping test using the Nichiban tape having 100 lattices having the size of 1 mm×1 mm. The results are described in Table 3.

TABLE 3

| Entry | Thickness of polyarylate layer (μm) | Stripping test |
|---|---|---|
| Comparative Example 1 | 5.0 | x |
| Synthetic Example 1 | 5.7 | x |
| Synthetic Example 2 | 5.3 | Δ |
| Synthetic Example 3 | 3.3 | o |
| Synthetic Example 4 | 5.8 | x |
| Synthetic Example 5 | 5.4 | Δ |
| Synthetic Example 6 | 4.9 | o |
| Synthetic Example 7 | 4.0 | x |
| Synthetic Example 8 | 5.0 | x | x denotes the case of when 100 lattices were all stripped from the tape,
Δ denotes the case of when 20 lattices were stripped, and
o denotes the case of when the stripping did not occur.

INDUSTRIAL APPLICABILITY

A compensation film according to the present invention includes a polyarylate layer comprising the polyarylate that is prepared by copolymerizing divalent phenols, aromatic carboxylic acids, and allyl bisphenol derivatives. Since the polyarylate layer has high negative birefringence, the layer may be used as a negative C-type compensation film for increasing a viewing angle of a liquid crystal display without the stretching process. Furthermore, the thickness of the polyarylate layer is controlled to easily adjust a phase difference. Thereby, it is possible to produce the compensation film having the desired phase difference and to significantly reduce the thickness of the compensation film. Additionally, since the double bond or the functional group is provided to the main chain of the polymer as well as the ends of the polymer in polyarylate, it is possible to improve interlayer adhesion force through chemical bonding to the base substrate or the protective layer in the multilayered compensation film.

The invention claimed is:
1. A negative C-type compensation film comprising:
   a) a base layer; and
   b) a polymer layer comprising polyarylate which comprises a repeating unit represented by the formula (1) and prepared by copolymerizing divalent phenols, divalent aromatic carboxylic acid halides, and 0.01 to 49.9 mol % of bisphenol derivatives of the formula (2), the base layer and the polymer layer being sequentially layered,

(1)

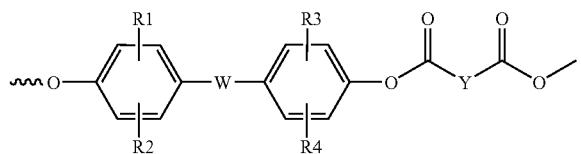

-continued

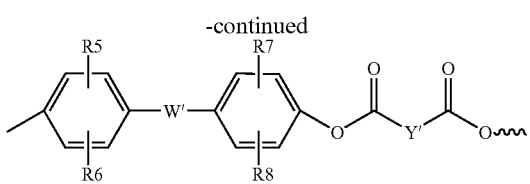

wherein $R^1$ to $R^8$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, in which the alkenyl of the above substituent(s) may be introduced with at least one functional group of an epoxide group, an alkoxy group, a hydroxy group and an amine group, provided that at least one of $R^1$ to $R^4$ or at least one of $R^5$ to $R^8$ is alkenyl having 2 to 12 carbon atoms, alkylalkenyl having 3 to 12 carbon atoms or arylalkenyl having 8 to 12 carbon atoms, in which the alkenyl of the above substituent(s) may be introduced with at least one functional group of an epoxide group, an alkoxy group, a hydroxy group and an amine group;

W and W' are each independently directly bonded, or are each independently oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms; and —OOCYCOO— and —OOCY'COO— are each independently terephthalic acid, isophthalic acid, dibenzoic acid or naphthalene dicarboxylic acid, in which the aromatic group may be substituted with a substituent selected from the group consisting of alkyl having 1 to 8 carbon atoms, aryl, alkylaryl and halogen, and

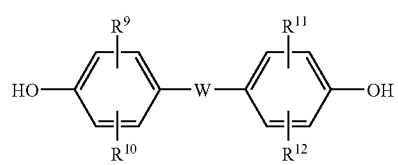
(2)

wherein $R^9$ to $R^{12}$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, provided that at least one of $R^9$ to $R^{12}$ is alkenyl having 2 to 12 carbon atoms, alkylalkenyl having 3 to 12 carbon atoms or arylalkenyl having 8 to 12 carbon atoms; and W is directly bonded, or is oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms.

2. The negative C-type compensation film according to claim 1, wherein the compensation film has a phase difference in thickness direction, defined by the following equation (1), that has a negative value, and is 30 nm or more:

$$R_{th} = \left(n_z - \frac{n_x + n_y}{2}\right) \times d \quad (1)$$

wherein $n_z$ is a refractive index of the film in thickness direction, $n_x$ and $n_y$ are refractive indexes of the film in surface direction, d is a thickness of the film, and $R_{th}$ is the phase difference in thickness direction.

3. The negative C-type compensation film according to claim 1, wherein the base layer is selected from a glass plate and a polymer film, which is formed of a polymer selected from the group consisting of polycarbonate, triacetyl cellulose, a cycloolefin polymer, a cycloolefin copolymer, a (meth) acrylate polymer, and a mixture of two or more thereof, the phase difference of the base layer, defined by the equation (1), is 100 nm or less, and a thickness of the base layer is 10 to 200 μm:

$$R_{th} = \left(n_z - \frac{n_x + n_y}{2}\right) \times d \quad (1)$$

wherein $n_z$ is a refractive index of the film in thickness direction, $n_x$ and $n_y$ are refractive indexes of the film in surface direction, d is the thickness of the film, and $R_{th}$ is the phase difference in thickness direction.

4. The negative C-type compensation film according to claim 1, wherein the polyarylate comprises a repeating unit represented by the formula (3):

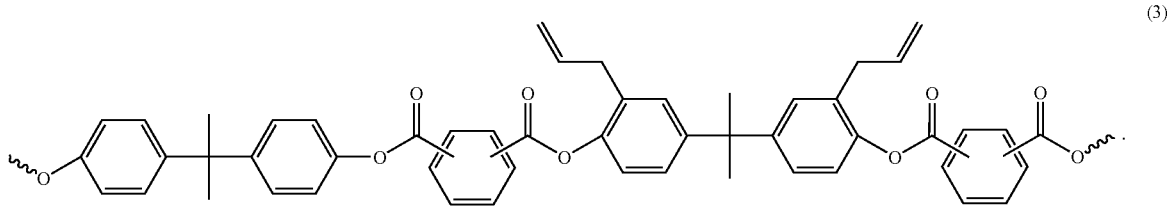
(3)

5. The negative C-type compensation film according to claim 1, wherein the polyarylate comprises a repeating unit represented by the formula (4):

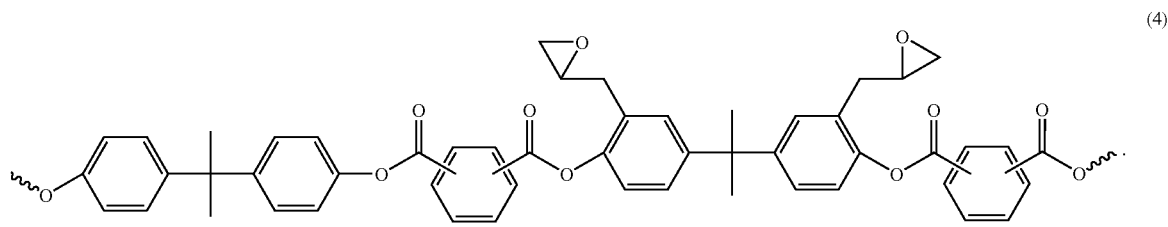

6. The negative C-type compensation film according to claim 1, wherein the polyarylate comprises a repeating unit represented by the formula (5):

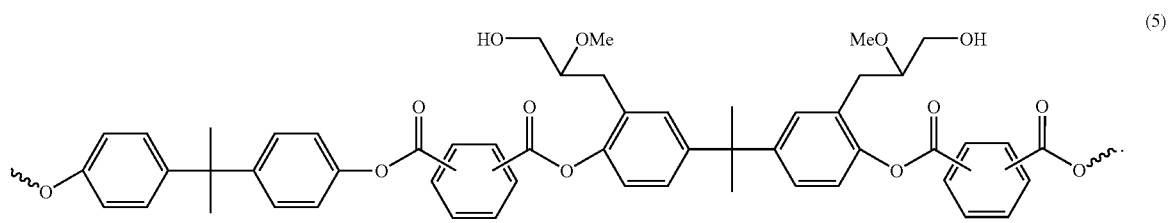

7. The negative C-type compensation film according to claim 1, wherein the polyarylate comprises a repeating unit represented by the formula (6):

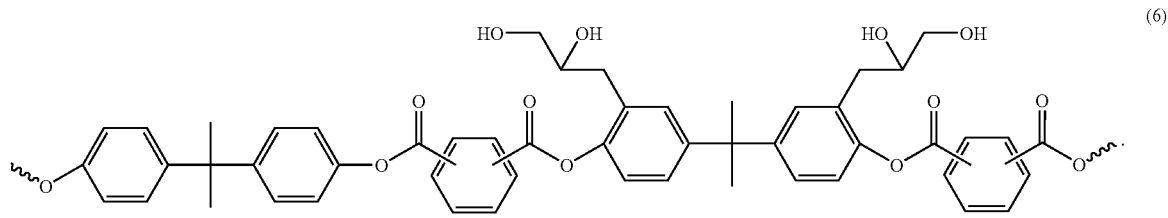

8. The negative C-type compensation film according to claim 1, further comprising a protective layer on at least one side of the base layer and/or at least one side of the polymer layer formed of polyarylate.

9. The negative C-type compensation film according to claim 8, wherein the protective layer is an organic/inorganic hybrid protective layer, or an organic protective layer,
wherein the organic/inorganic hybrid protective layer is formed of a composition selected from the group consisting of a composition comprising organosilane, metal alkoxide, and a filler; a composition comprising an acryl resin, which is selected from the group consisting of an acrylate oligomer solution, a methacrylate oligomer solution, and an acrylate/methacrylate oligomer solution, a silica-dispersed oligomer solution of organosilane, and a curing catalyst; and a composition comprising a silicone oligomer solution, which has two or more acrylate functional groups by hydrolyzing a silicone coupling agent and oily colloidal silica, an acrylate oligomer solution, an acrylate monomer solution, a photo-initiator, and/or a thermal initiator,
wherein the organic protective layer is formed of a polymer selected from the group consisting of an acrylate polymer, a methacrylate polymer, and an acrylate/methacrylate copolymer.

10. The negative C-type compensation film according to claim 1, further comprising a surface reforming layer between the base layer a) and the polymer layer b).

11. A method of preparing a negative C-type compensation film, the negative C-type compensation film comprising a base layer and a polymer layer comprising polyarylate, comprising:
a) mixing the polyarylate, which comprises a repeating unit represented by formula (1) and is prepared by copolymerizing divalent phenols, divalent aromatic carboxylic acid halides, and 0.01 to 49.9 mol % of bisphenol derivatives of the formula (2), and an organic solvent to prepare a polyarylate solution;
b) applying the polyarylate solution on a base substrate, and volatilizing a solvent to produce a cast film; and
c) drying the case film to produce the negative C-type compensation film,

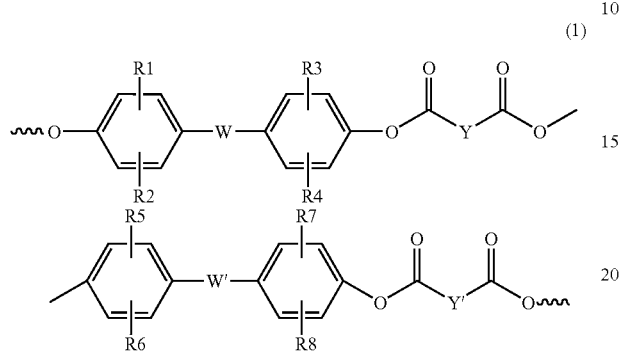

(1)

wherein $R^1$ to $R^8$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, in which the alkenyl of the above substituent(s) may be introduced with at least one functional group of an epoxide group, an alkoxy group, a hydroxy group and an amine group, provided that at least one of $R^1$ to $R^4$ or at least one of $R^5$ to $R^8$ is alkenyl having 2 to 12 carbon atoms, alkylalkenyl having 3 to 12 carbon atoms or arylalkenyl having 8 to 12 carbon atoms, in which the alkenyl of the above substituent(s) may be introduced with at least one functional group of an epoxide group, an alkoxy group, a hydroxy group and an amine group;
W and W' are each independently directly bonded, or are each independently oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms; and
—OOCYCOO— and —OOCY'COO— are each independently terephthalic acid, isophthalic acid, dibenzoic acid or naphthalene dicarboxylic acid, in which the aromatic group may be substituted with a substituent selected from the group consisting of alkyl having 1 to 8 carbon atoms, aryl, alkylaryl and halogen, and

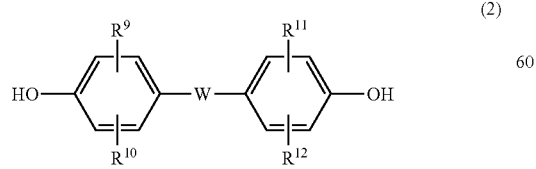

(2)

wherein $R^9$ to $R^{12}$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, provided that at least one of $R^9$ to $R^{12}$ is alkenyl having 2 to 12 carbon atoms, alkylalkenyl having 3 to 12 carbon atoms or arylalkenyl having 8 to 12 carbon atoms; and W is directly bonded, or is oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms.

12. A liquid crystal display having the negative C-type compensation film comprising:
a) a base layer; and
b) a polymer layer comprising polyarylate which comprises a repeating unit represented by the formula (1) and prepared by copolymerizing divalent phenols, divalent aromatic carboxylic acid halides, and 0.01 to 49.9 mol % of bisphenol derivatives of the formula (2), the base layer and the polymer layer being sequentially layered,

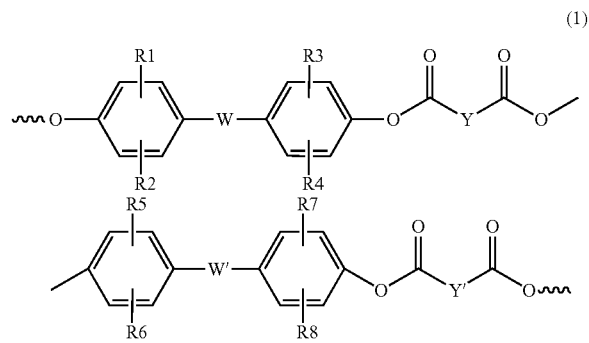

(1)

wherein $R^1$ to $R^8$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, in which the alkenyl of the above substituent(s) may be introduced with at least one functional group of an epoxide group, an alkoxy group, a hydroxy group and an amine group, provided that at least one of $R^1$ to $R^4$ or at least one of $R^5$ to $R^8$ is alkenyl having 2 to 12 carbon atoms, alkylalkenyl having 3 to 12 carbon atoms or arylalkenyl having 8 to 12 carbon atoms, in which the alkenyl of the above substituent(s) may be introduced with at least one functional group of an epoxide group, an alkoxy group, a hydroxy group and an amine group;
W and W' are each independently directly bonded, or are each independently oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms; and —OOCYCOO— and —OOCY'COO— are each independently terephthalic acid, isophthalic acid, dibenzoic acid or naphthalene dicarboxylic acid, in which the aromatic group may be substituted with a substituent selected from the group consisting of alkyl having 1 to 8 carbon atoms, aryl, alkylaryl and halogen, and

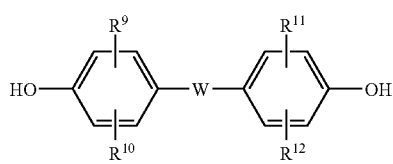

(2)

wherein $R^9$ to $R^{12}$ are each independently hydrogen, alkyl having 1 to 12 carbon atoms, arylalkyl having 7 to 12 carbon atoms, aryl having 6 to 12 carbon atoms, nitrile, alkylenenitrile having 2 to 12 carbon atoms, alkoxy having 1 to 12 carbon atoms, acyl having 1 to 12 carbon atoms, alkenyl having 2 to 12 carbon atoms, alkylalkenyl having 3 to 12 carbon atoms, arylalkenyl having 8 to 12 carbon atoms or halogen, provided that at least one of $R^9$ to $R^{12}$ is alkenyl having 2 to 12 carbon atoms, alkylalkenyl having 3 to 12 carbon atoms or arylalkenyl having 8 to 12 carbon atoms; and W is directly bonded, or is oxygen, sulfur, sulfoxide, sulfone, alkylidene having 1 to 30 carbon atoms, alkylene having 2 to 30 carbon atoms, cycloalkylidene having 3 to 30 carbon atoms, cycloalkylene having 3 to 30 carbon atoms or phenyl-substituted alkylene having 2 to 30 carbon atoms.

13. The liquid crystal display according to claim 12, wherein
the compensation film has a phase difference in thickness direction, defined by the following equation (1), that has a negative value, and is 30 nm or more:

$$R_{th} = \left(n_z - \frac{n_x + n_y}{2}\right) \times d \qquad (1)$$

wherein $n_z$ is a refractive index of the film in thickness direction, $n_x$ and $n_y$ are refractive indexes of the film in surface direction, d is a thickness of the film, and $R_{th}$ is the phase difference in thickness direction.

14. The liquid crystal display according to claim 12, wherein the base layer is selected from a glass plate and a polymer film, which is formed of a polymer selected from the group consisting of polycarbonate, triacetyl cellulose, a cycloolefin polymer, a cycloolefin copolymer, a (meth)acrylate polymer, and a mixture of two or more thereof, the phase difference of the base layer, defined by the equation (1), is 100 nm or less, and a thickness of the base layer is 10 to 200 μm:

$$R_{th} = \left(n_z - \frac{n_x + n_y}{2}\right) \times d \qquad (1)$$

wherein $n_z$ is a refractive index of the film in thickness direction, $n_x$ and $n_y$ are refractive indexes of the film in surface direction, d is the thickness of the film, and $R_{th}$ is the phase difference in thickness direction.

15. The liquid crystal display according to claim 12, wherein the polyarylate comprises a repeating unit represented by the formula (3):

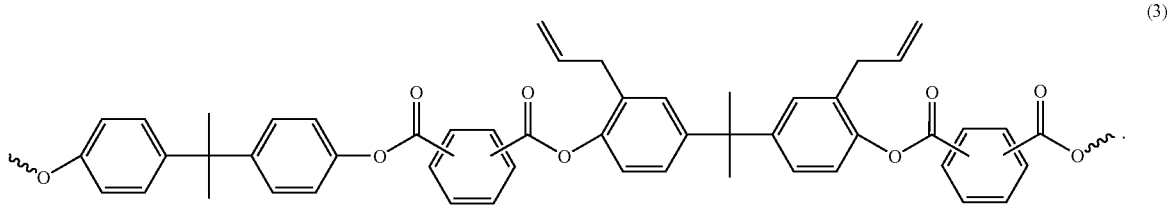

(3)

16. The liquid crystal display according to claim 12, wherein the polyarylate comprises a repeating unit represented by the formula (4):

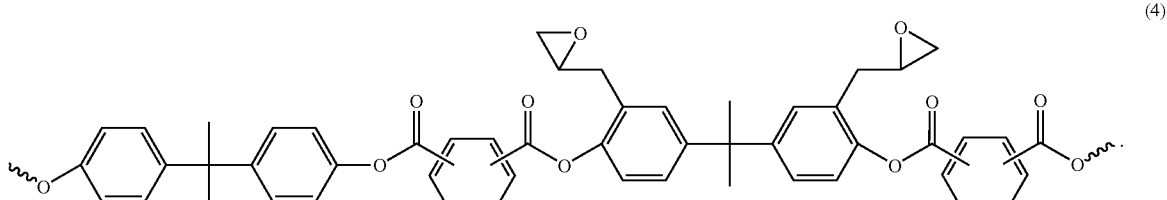

(4)

17. The liquid crystal display according to claim 12, wherein the polyarylate comprises a repeating unit represented by the formula (5):

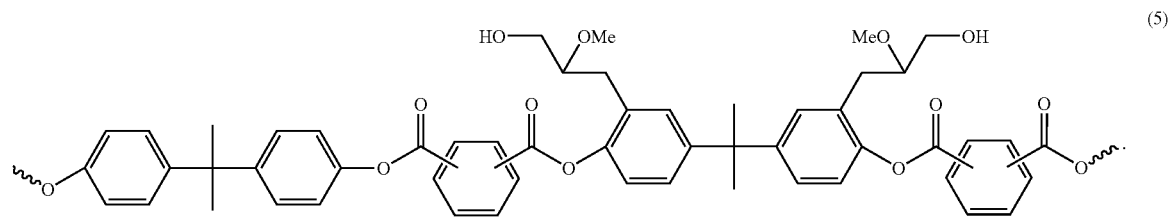

(5)

18. The liquid crystal display according to claim 12, wherein the polyarylate comprises a repeating unit represented by the formula (6):

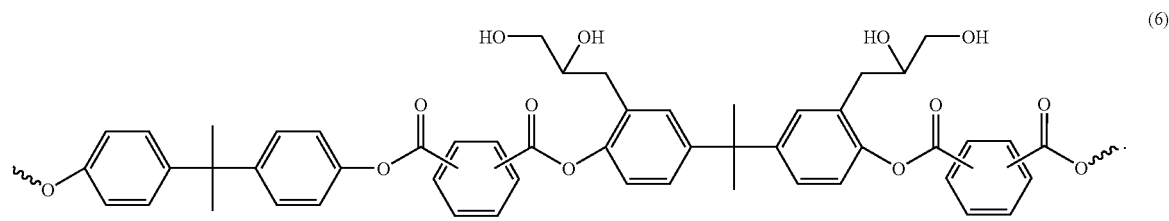

(6)

19. The liquid crystal display according to claim 12, wherein the negative C-type compensation film further comprises a protective layer on at least one side of the base layer and/or at least one side of the polymer layer formed of polyarylate.

20. The liquid crystal display according to claim 12, wherein the negative C-type compensation film further comprises a surface reforming layer between the base layer a) and the polymer layer b).

* * * * *